INVENTORS.
Charles R. Wiles
David L. Russell

United States Patent Office 3,161,912
Patented Dec. 22, 1964

3,161,912
CONTINUOUS MOLDING APPARATUS
Charles R. Wiles and David L. Russell, Midland, Mich., assignors to The Dow Chemical Company, Midland, Mich., a corporation of Delaware
Filed Feb. 10, 1964, Ser. No. 343,553
5 Claims. (Cl. 18—6)

This invention relates to a process and apparatus for continuously molding thermoplastic material. It more particularly relates to a process and apparatus for continuously molding particulate expandable thermoplastic resinous material.

The molding and shaping of articles from particulate expandable thermoplastic materials is often accomplished by using a single mold and adding to the mold unfoamed, or partially foamed, particulate material closing the mold and subsequently heating the mold to a temperature sufficiently high to cause the particulate thermoplastic resinous material to knit together into a coherent unitary object. Various methods are employed to form such bodies such as the methods described in United States Patents 2,787,809 and 2,744,291, wherein a particulate mass is confined in a mold and immersed in a hot liquid.

Techniques such as these require relatively long cycle times. By the term "cycle time" is meant the elapsed time between loading of the particulate material into the mold and removing the shaped article therefrom. Frequently, it is desirable to mold a number of different articles having different shapes and cross sections which usually require variations in the molding technique, cycle time, heating time, cooling time, and the like.

It is an object of this invention to provide a method for the continuous molding of thermoplastic organic resinous expandable particulate material.

It is a further object of this invention to provide an apparatus for the continuous molding of such material.

It is still another object of this invention to provide an apparatus which permits the continuous molding of resinous thermoplastic expandable particulate material into articles having different cross sections, shapes, and techniques and maintaining substantially constant cycle time.

It is a further object of this invention to provide a process and apparatus which will permit the molding of large numbers of articles from particulate expandable thermoplastic resinous material in a relatively short time.

These objects and other benefits and advantages are readily achieved in accordance with the method of the invention by confining in each of a plurality of sequential cavities a mass of expandable thermoplastic resinous material, providing between generally adjacent and sequentially arranged cavities a one way communication path subjecting said cavities to the following sequential operations:

(a) Exhausting at least a portion of the gases contained therein;

(b) Passing a fluid heat exchange medium through said material contained in said cavities;

(c) Heating said masses to a temperature sufficient to cause said masses to expand and knit together to form a unitary cellular body;

(d) Withdrawing said heating medium;

(e) Cooling said masses to a temperature below the heat distortion temperature of said expanded masses, with the further limitation that at least a portion of the heat exchange fluid is passed sequentially through at least two of said masses.

Also contemplated within the scope of the invention is a continuous molding apparatus comprising, in cooperative combination, a body defining a passageway, said passageway being provided with a first major opening and a second major opening, said opening disposed generally along the major dimension of said passageway, said passageway also being provided with a plurality of spaced side ports adapted to provide communication between the interior of the passage and external supply means, with each of the plurality of ports a plurality of molds, said molds adapted to slide within said passageway, each of said molds having means to seal said passage and means to maintain spaced relationship between said sealing means, each of said molds being provided with a communication passageway from the interior of said mold to the exterior of said mold and the opposite side of said sealing means from said cavity, said mold communication passageway being provided with a check valve so constructed and arranged so as to permit the flow of fluid from the interior of the mold cavity only, said molds adapted to be placed in stacked relationship within said body and said side ports of said passageway adapted to communicate with the space between the sealing means of adjacent molds, said mold passageway having a first end and a second end, said molds adapted to enter said first end and be removed at said second end, means provided adjacent said first end to maintain a mold adjacent said first end in affixed position when desired and means adapted to insert a mold into said first end without releasing a mold positioned within said first end, means adjacent said second end of said passageway to optionally maintain said rolls in position and means in operative cooperation with said means to insert said mold adjacent said first end to remove said molds at said second end, ports adjacent said first end in operative communication with means to remove fluids from said passageway, the ports adjacent said ports operatively connected to means to evacuate fluids from said passageway, operatively connected to means to introduce a heating fluid into said passageway, and ports adjacent to said second end operatively connected to means to remove fluids from said passageway and means to cool said molds within said passageway.

Further features and advantages of the invention will become more apparent when taken in conjunction with the following specification and drawing wherein.

Figure 1:
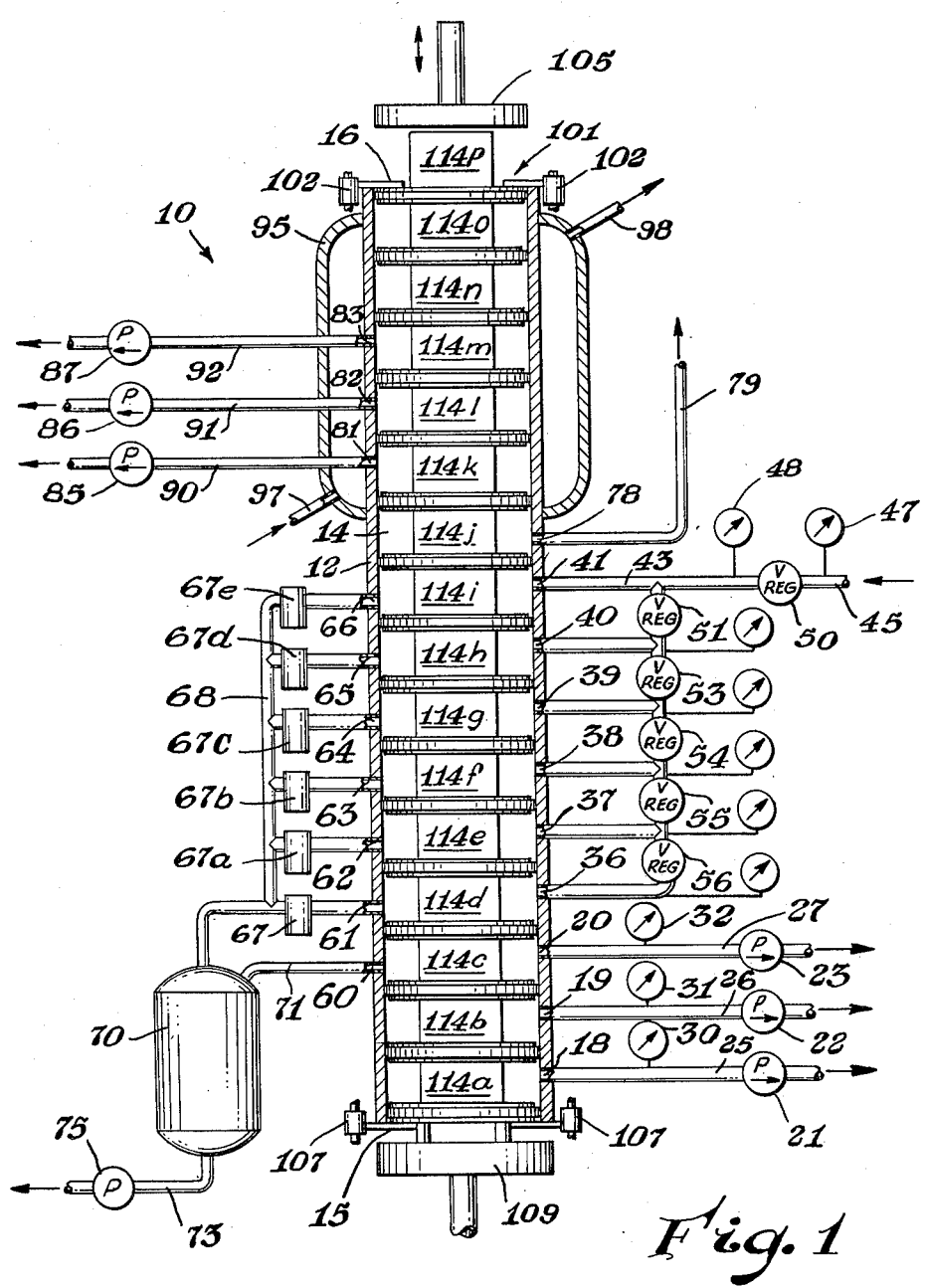
FIGURE 1 is a schematic cross sectional representation of an apparatus in accordance with the invention.

In FIGURE 1 there is illustrated a molding apparatus in accordance with the invention generally designated by the reference numeral 10. The apparatus 10 comprises a body or elongated mold tube 12 defining a passageway 14. The passageway 14 is provided with a first major opening 15 and a second major opening 16. Disposed generally along the major dimension of said passageway 14 are provided a plurality of ports. Adjacent the opening 14 are the evacuation ports 18, 19, and 20 which are in communication with the evacuating pumps 21, 22 and 23 by means of the conduits 25, 26 and 27. The conduits 25, 26 and 27 are provided with pressure indicating means 30, 31 and 32, respectively. Adjacent to said evacuating ports and disposed toward the opening 16 of the body 12 are a plurality of heating fluid entry ports 36, 37, 38, 39, 40 and 41. The port 41 is connected by means of line 43 to a heat exchange fluid header 45 having pressure indicating means 47 and 48 and pressure regulating valve 50. The line 43 communicates with the port 40 through pressure regulating valve 51. The port 39 communicates with the output side of the pressure regulating valve 51 through the pressure regulating valve 53. The port 38 communicates with the output side of the valve 53 through the regulator 54. The port 37 communicates with the output side of the regulator valve through the regulator valve 55. The port 36 communicates with the output side of the pressure regulator valve 55 through the pressure regulator valve 56.

Generally adjacent the ports 36–41 are disposed a condensate discharge port 60 disposed generally opposite the port 20, a port 61 disposed below and opposite the port 36, a port 62 disposed below and generally opposite the port 37, a port 63 disposed below and opposite the port 38, a port 64 disposed below and opposite the port 39. A port 65 is disposed below and opposite the port 40 and a port 66 is disposed below and opposite the port 41. The ports 61 through 66 inclusive are in communication with a common header 68 through the traps 67, 67a, 67b, 67c, 67d and 67e. The header 68 is so constructed and arranged so as to drain into a condensate receiver 70. Communication between the condensate receiver 70 and the port 60 is provided by means of the line 71. Condensate accumulating in the condensate receiver 70 is removed through line 73 and by a condensate pump 75. Generally adjacent the port 41 and disposed toward the opening 16 is an exhaust port 78 in full connection with a vent line 79. Within the jacket portion of the body 12 and disposed between the port 78 and the opening 16 are the ports 81, 82 and 83 in spaced relationship to each other along the axis of the body or tube 12. The ports 81, 82 and 83 are in communication with the evacuation pumps 85, 86, and 87, respectively, by means of the conduits 90, 91, and 92, respectively. A jacket 95 is provided about the body 12 adjacent the opening 16 and including that portion of the body 12 including ports 81, 82 and 83. The jacket 95 is provided with a heat exchange fluid inlet means 97 and a heat exchange fluid outlet means 98. Disposed adjacent the opening 16 of the body 12 is a mold retaining means generally designated 101 and comprising a plurality of lugs 102. In cooperative combination with the lugs 102 is a mold retaining piston 105 positioned generally centrally with the axis of the tubular body 12. Cooperatively connected to the lugs by means not shown for the sake of clarity, are lugs 107 and a second mold retaining means 109. The mold retaining means 109 is provided with a pair of indexing pins 111. Schematically represented within the passageway 14 of the body 12 are a plurality of generally similar molds designated by the reference numerals 114a, 114b, 114c, 114d, 114e, 114f, 114g, 114h, 114i, 114j, 114k, 114l, 114m, 114n, 114o, and 114p. The molds 114a–p inclusive are substantially identical in their manner of operating and general configuration and one is shown in detail in FIGURE 2.

Figure 2:
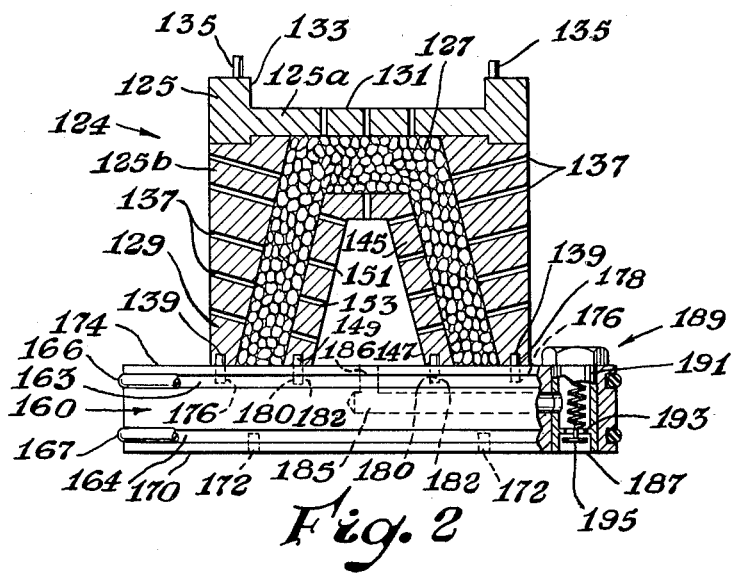
FIGURE 2 is a cross sectional representation of a mold assembly as utilized in the apparatus of FIGURE 1.

In FIGURE 2 there is illustrated a mold in accordance with the present invention designated by the general reference numeral 124. The mold 124 has a perforated female mold part 125 consisting of portions 125a and 125b. The female mold part 125 defines a mold cavity 127, a base portion 129 and a top or closed portion 131. Disposed adjacent the closed portion 131 is a flange or rim 133 provided with indexing pins 135. The body of the female mold portion 125 is provided with a plurality of vents or perforations 137 providing communication between the inner and outer surfaces of the female mold portion 125. At least a pair of recesses indicated by the reference numeral 139 are provided in the base portion 129. The mold 124 has disposed within the cavity 127 of the female mold portion 125 a male mold portion 145. The male mold portion 145 has a base portion 147 which is provided with at least a pair of cavities 149. The male mold portion 145 is provided with a plurality of vents 151 providing communication between the outer surface of the mold portion 145 and a space 153 defined therein. A third component of the mold 124 is a base plate or piston 160. The piston 160 is so constructed and arranged to engage the inner surface of the passageway 14 of the molding apparatus of FIGURE 1 in sealing engagement therewith. The body portion 160 defines an upper circumferential groove 163 and a lower circumferential groove 164. Disposed within the circumferential grooves 163 and 164 are the gaskets 166 and 167, respectively. The gaskets 166 and 167 are of the O-ring type. The piston 160 is provided with a lower surface 170 having formed therein a pair of cavities 172 adapted to engage locating pins such as 135 of the female mold form 125. The piston 160 has a major upper surface 174 having formed therein a pair of cavities 176 in which there are disposed the dowel pins 178 which engage the cavities 139 of the female mold portion 125. Also formed within the upper surface 174 of the pistons 160 are the cavities 180 which have disposed therein dowel pins 182. The dowel pins 182 are adapted to engage the cavities of the male mold 145. The piston 160 defines a passage 185 having an opening 186 centrally disposed within the upper surface 174 of the piston and terminating toward the edge of the piston 160 on the face 170 by means of the opening 187. Disposed partially within the passageway 185 is a check valve assembly designated generally by the reference numeral 189. The check valve 189 comprises a body portion 191. The body portion 191 is generally coextensive with the passageway 185 connecting directly with the opening 186 whereas the terminal portion of the valve 191 is generally coextensive with the opening 187 disposed on the face 170 of the piston 160. The body 191 defines a valve seat 193; disposed adjacent the valve seat 193 is a valve means 195 which is adapted to rest against the seat 193 in sealing engagement therewith and maintained against the seat 193 by means of the tension spring 197. Thus, in operation a fluid may enter the opening 186, travel through the passage 185 into the vented body 191 and be discharged through the opening 187 on the opposite face of the piston 160.

Figure 3:
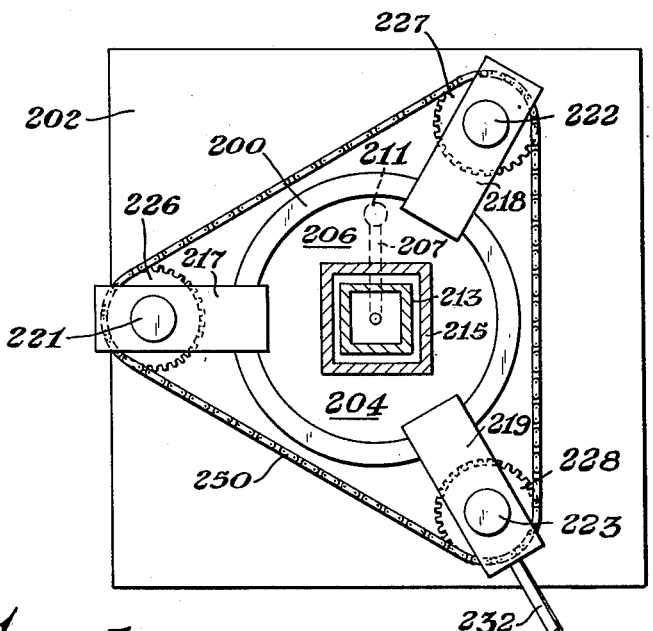
FIGURE 3 depicts a plan view of a mold retaining mechanism utilized in the apparatus of FIGURE 1.

A schematic representation of a partial top view of an apparatus in accordance with FIGURE 1, shown in FIGURE 3, is a mold tube or body 200 having rigidly secured thereto a base or plate 202. Disposed within the tube 200 is a mold assembly 204. The mold assembly 204 comprises a base plate or piston 206 in sealing engagement with the internal surface of tube 200. The piston or body portion 206 is provided with an internal passageway 207 providing communication from the central portion of the upper surface of the piston 206 through the opening of 209 and discharging to the lower face of the piston at the generally perpendicularly disposed opening 211. Positioned on the upper surface of the piston 206 and shown in section is a male mold form 213 and a female mold form 215. The piston 206 is prevented from moving upwardly in a tube 200 by means of the retaining lugs 217, 218 and 219. The lugs 217, 218 and 219 are perpendicularly located on the shafts 221, 222 and 223, respectively. The shafts 221, 222, and 223 are provided with sprocket gears 226, 227 and 228 in operative engagement by means of a roller chain 230. The sprocket gear 228 is provided with an activating means and handle 232. Thus, by operating the handle 232, the retaining lugs 217, 218 and 219 may be simultaneously engaged or disengaged. Beneficially, the shafts 221, 222 and 223 are the entire length of the molding apparatus and carry a similar set of lugs at the opposite end so constructed and arranged to be disengaged from a piston such as 206 when the lugs at the opposite end engage a piston such as 206.

In operation of the apparatus in accordance with the invention, a mold such as is shown in FIGURE 2 is charged by placing an expandable resinous thermoplastic material into a space defined by the male mold portion 145. The mold and piston assembly is inserted within the tube 12. A second generally annular assembly is inserted immediately thereafter in such a manner that the female mold indexing pins 135 engage the appropriate recesses on the opposite surface of the adjacent piston. A sufficient number of molds are inserted into the tube to completely fill the tube with molds and index the sealing surfaces such as 166 and 167 of the pistons such as 160 in a position intermediate between the individual inlet and outlet ports such as 18, 19, 20, 36, 37, 38, 39, 40, 41, 61, 62, 63, 64, 65, 66, 81, 82 and 83. The vacuum pumps 21, 22 and 23 are started, withdrawing air from the spaces between the molds a, b and c of FIGURE 1. A heating fluid such as steam at appropriate pressures for the material being molded is caused to flow into the spaces below the molds such as 114e, 114f, 114g, 114h, 114i and 114j while fluid such as condensate is removed through the ports 61, 62, 63, 64, and 65, which are also in communication with the spaces occupied by the molds 114e, 114f, 114g, 114h, 114i and 114j. The space occupied by the mold 114j is vented to the atmosphere while the spaces between the molds 114k, 114l and 114m are evacuated through the ports 81, 82 and 83 by the pumps 85, 86, and 87, respectively. When equilibrium conditions are established within the molding unit, additional molds are added and removed to provide a finished shaped article in the following manner.

A freshly charged mold is introduced below the opening 15 while a mold such as 114 is retained in position by the holding lugs 107. After the piston or mold retaining means 109 is withdrawn a mold is indexed on the retaining means 109 and the indexing pins of the new mold engage the piston of the mold 114. The mold adjacent opening 16 is retained by the mold retaining means 105 and retaining lugs 102 and 107 are released after the mold retaining means 105 and 109 have a secure grip on the stack of molds. The stack of molds may then be positioned within the tube 12 to force the mold adjacent the opening 16 out of the tube. The lugs 102 then engage the piston of the next mold and the retaining means 109 may be released and the mold assembly removed. The holding device 105 is then removed into a position to engage the nearest mold. Meanwhile, the air is removed from the space between the mold in the lower portion of the column and steam is injected through port 36 which passes through the perforated female mold member through the particulated experimental thermoplastic resinous materials contained in the space defined by the male and female mold portions. The steam pressure injected into the ports 36, 37, 38, 39, 40 and 41 increases with increasing numerical order so that the temperature of the foamable particulate thermoplastic resinous materials contained within the mold cavities is gradually and uniformly raised to a temperature at which the material will expand and knit together into a unitary body of foamed plastic material. Beneficially, the path of the fluid such as steam injected into the space between the molds 114i and 114j of FIGURE 1 from the port 41 is through the particiulated resinous materials in mold 114i. The steam or similar heating fluid is transferred through the passageway of the piston of mold 114i into the space between the pistons of the molds 114i and 114h and subsequently through the particulate plastic contained in the mold 114h and, in a similar manner, through the remaining molds until any uncondensed fluid is finally exhausted by the pump 23. The condensate, in the case of steam heating is removed by the condensate ports 61 and 66 inclusive and their associate header 68. Thus, in the operation of the invention, the heating fluid is utilized to its maximum ability by what might be termed a counter-current flow process. After the thermoplastic resinous material is heated to a sufficient degree by the steam entering through the port 41, the mold is moved to a position of the mold 114j of FIGURE 1. In this period, the space between the molds 114j and 114k is in communication with the atmosphere by means of port 78 and its associated vent line 79. The escape of steam serves to cool the foamed body to a temperature approximately about 100° centigrade. When the next mold is added to the tube, the vented mold advances to the position of mold 114k wherein the pump 85 through the line 90 induces a pressure substantially below atmospheric. This causes further cooling of the mold and article and another mold is added thereto. The mold advances to the position of mold 114l wherein the pressure is still further reduced to result in the removal of more condensate from the article and the space between the pistons of the molds 114l and 114m. Upon the addition of another mold, a still lower pressure is applied to remove substantially all of the moisture present in the space between the pistons of the molds 114m and 114n and from the foamed shaped article contained within the mold 114m. The positions of molds 114n and 114o serve as inventory and further cooling prior to removing the mold which is shown in the location defined as 114p. The portion of the molding chamber of tube 12 wherein the evacuation and cooling occurs is surrounded by the jacket 95 through which a coolant is circulated to hasten the cooling of the molds and their contents contained within this section. Beneficially, if lower production rates are desired, it is not necessary to utilize a tube sufficiently long to contain 15 molds as depicted in FIGURE 1, but the apparatus can be altered to contain as few as 4 sections, but preferably 5. These sections are: (a) the evacuation which would correspond to the position of mold 114a in FIGURE 1; (b) and the addition of steam or other heating fluid as shown by mold 114i of FIGURE 1; (c) the venting to the atmosphere as shown by the position of mold 114j, and (d) evacuation and cooling such as occurs at the position of mold 114m. Further simplification could result in a combination of venting in the vacuum system, that is, combing the functions of the chambers shown by 114j and 114m. This is not generally advantageous because of the requirement of a higher capacity pump for evacuation.

Beneficially, the apparatus in accordance with the invention provides a means of enclosing a particulate foamable thermoplastic resinous mass within the mold, removing the air or other undesired gases from the mold, gradually raising the temperature of the particulate mass within the mold by means of passing steam or a similar heat exchange medium through the walls of the mold through the particulate mass to provide a uniform heating thereof, sequentially raising the temperature of the molds and particulate thermoplastic mass contained therein until a temperature is reached at which the thermoplastic reinous material expands and unites into a substantially unitary body. The mold and its contents are then cooled and in the embodiment of the invention utilizing steam as a heating means the initial cooling is attained by reducing the pressure in the mold cavity and subsequently the pressure in the mold cavity is reduced below atmospheric pressure which serves to cool and mold the contents as well as provide a substantially water-free product.

By utilizing molding apparatus in accordance with the invention, it is possible to mold a wide variety of articles in a continuous manner. These articles may be similar or different. The construction of the molds permits a wide variation of the article in thickness. By providing a suitable number of perforations in the wall of the mold, a controlled amount of heat exchange fluid such as steam is permitted to pass into the particulate expandable thermoplastic resinous mass contained within the inner and outer mold portions. Typically, if an article such as a box or similar container having a peripheral wall thickness of about ¼ of the desired thickness of the base or bottom is to be molded, a greater number of perforations are provided in the inner and outer mold portions adjacent the wider portion of the cavity defining the base of the container. Thus, by the judicial distribution of the vents, ports, or perforations in the mold wall, the rate of heat transfer from the heat transfer fluid to the particulate mass may be maintained substantially uniform even though the thickness of the mass being heated varies.

Beneficially, in operation of the invention with prefoamed polystyrene, each of said cavities is sequentially filled to at least 80 percent by volume of its capacity with discrete granules of incompletely foamed up polystyrene containing a volatile nonsolvent organic fluid raising agent which is capable of further expansion, reducing the pressure within the mold below atmospheric pressure, passing steam into contact with and through the mass of polymer granules therein at pressures not exceeding about 350 millimeters of mercury absolute, to heat the granules to about the softening point of the polymer, passing steam into contact with and through the polymer granules in the mold up to and including pressures of about 10 pounds per square inch gauge sufficient to heat the polymer to a temperature between 100 and 115° to cause the granules to knit together into a unitary cellular body, subsequently withdrawing steam from contact with the mold and subjecting the mold to an absolute pressure of no more than 350 millimeters of mercury, cooling the mold to a temperature below the softening point of the foamed unitary body contained therein and subsequently removing the bodies from the cavities.

In a typical operation in accordance with the invention wherein a particulate expandable polystyrene resin is formed into shipping containers, molds and apparatus substantially as shown in FIGURES 1 and 2 are utilized. The mold cavity is filled with a predetermined quantity of a partially expanded polystyrene and the mold assembled onto the piston.

The piston is then positioned below the tube 20 and inserted therein. The first stage equivalent to the mold marked 114a is subjected to a pressure of 12 pounds per square inch absolute and the air is evacuated from the space between adjacent pistons and from the mold cavity. The second stage 114b as shown is operated at a pressure of about 9 pounds per square inch absolute. The third stage 114c is operated at a pressure of about 6 pounds per square inch absolute. Steam is provided to the header 45 at a pressure of about 40 pounds per square inch absolute and passes through the pressure reducer 50 which maintains the downstream pressure of 24 pounds per square inch absolute which is applied to the chamber 114i. The reducer 51 downstream from the reducer 50 applies a pressure of 21 pounds per square inch absolute to the mold stage 114h. Similarly, the mold 114g has a pressure of 18 pounds per square inch absolute, 114f of 15 pounds per square inch absolute, 114e of 12 pounds per square inch absolute, and 114d of about 9 pounds per square inch absolute. As the mold chambers are sequentially moved in the tube on reaching the position designated as 114j in FIGURE 1, the vent port 78, the conduit 79 reduces the internal pressure to atmospheric. The positions or locations 114k, 114l, and 114m are reduced to the pressures of 12, 9 and 6 pounds per square inch absolute, respectively while cooling water at a temperature of about 15° centigrade is circulated within the jacket 95. In this manner, shipping containers of the foamed polystyrene are produced at a rate of about 700 units per hour.

The shipping containers prepared by the hereinbefore described experiment are found to be uniform in size, weight, and the particles forming them are firmly and securely bonded to each other throughout the entire body.

In a manner similar to the foregoing, other expandable thermoplastic resinous materials including polystyrene and copolymers thereof, particularly those containing about 70 percent styrene and 30 percent acrylonitrile polymerized in the resinous material are readily formed by the apparatus of the present invention into a wide variety of shapes and sizes.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

This application is a continuation-in-part of our co-pending application Serial No. 213,940 filed August 1, 1962.

What is claimed is:

1. A continuous molding apparatus comprising in cooperative combination a body defining a passageway,
    said passageway being provided with a first major opening and a second major opening,
    said openings being disposed generally along the major dimension of said passageway,
    said passageway also being provided with a plurality of spaced side ports adapted to provide communication between the interior of the passage and external supply means individually in communication with each of the plurality of ports,
    a plurality of molds, said molds adapted to slide within said passageway and each of said molds having means to seal said passage and means to maintain spaced relationship between said sealing means, each of said molds being provided with a communication passageway from the interior of said mold to the exterior of said mold on the opposite side of said sealing means from said cavity,
    said mold communication passageway being provided with a check valve so constructed and arranged so as to permit the flow of fluid from the interior of said mold cavity only,
    said molds adapted to be placed in stacked relationship within said body and said side ports of said passageway adapted to communicate with the space between the sealing means of adjacent molds,
    said mold passageway having a first end and a second end, said molds adapted to enter said first end and be removed at said second end,
    means provided adjacent said first end to maintain a mold adjacent said first end in affixed position when desired and means adapted to insert a mold into said first end without releasing a mold positioned within said first end,
    means adjacent said second end of said passageway to optionally maintain said molds in position and means in operative cooperation with said means to insert said mold adjacent said first end to remove said molds at said second end,
    the ports adjacent said first end in operative communication with means to remove fluids from said passageway, the ports adjacent said ports operatively connected to means to evacuate fluids from said passageway, operatively connected to means to introduce a heating fluid into said passageway, and the ports adjacent to said second end operatively connected to means to remove fluids from said passageway and means to cool said molds within said passageway.

2. An apparatus in accordance with claim 1, wherein said body defines a generally cylindrical passageway.

3. The apparatus of claim 1, wherein said molds comprise a generally cylindrical disc-like member as the sealing means and a male and a female mold adapted to be keyed to one side of said sealing means.

4. The apparatus of claim 3, wherein said mold is adapted to rigidly engage the sealing means of an adjacent mold.

5. The apparatus of claim 1, wherein said side ports are in communication with the evacuating means at said first end and evacuating means at said second end and the ports disposed intermediate between those adjacent said first end, said second end and in communication with steam supply means.

References Cited in the file of this patent

UNITED STATES PATENTS

| | | |
|---|---|---|
| 1,348,669 | Talbot | Aug. 3, 1920 |
| 1,548,537 | McDonald | Aug. 4, 1925 |
| 1,677,200 | Oakley | July 17, 1928 |
| 2,873,475 | Linhorst | Feb. 17, 1959 |
| 3,046,600 | Linhorst | July 31, 1962 |